United States Patent Office 3,299,179
Patented Jan. 17, 1967

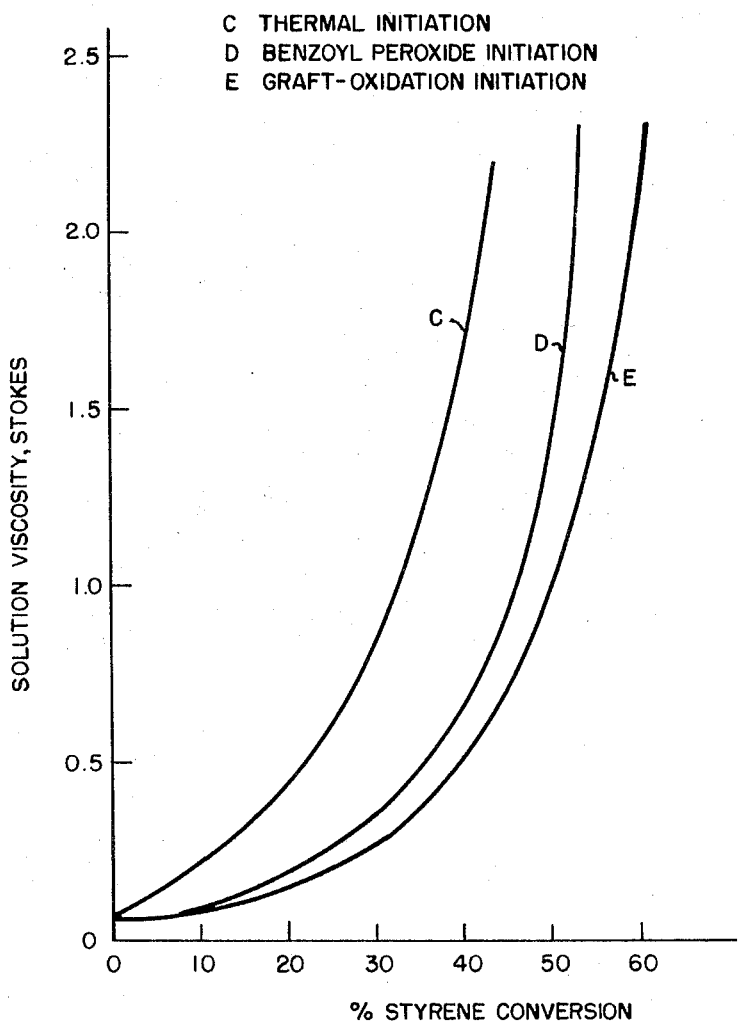

3,299,179
GRAFT COPOLYMER PREPARED BY REACTING AN OXIDIZED LIQUID DIOLEFIN POLYMER AND A VINYL MONOMER
George Rodney Rippel, Baton Rouge, La., assignor to Esso Research and Engineering Company, a corporation of Delaware
Filed June 14, 1963, Ser. No. 287,895
3 Claims. (Cl. 260—880)

This invention relates to a novel graft polymer and more particularly relates to a graft polymer formed from oxidized liquid diene polymers or copolymers and a vinyl monomer.

It is known to prepare graft polymers from homopolymers of conjugated diolefins or copolymers of such conjugated diolefins with vinyl aromatic hydrocarbons such as styrene. These graft polymers are prepared by grafting a reactive monomer such as styrene, vinyl toluene, alkyl styrenes, halostyrene, vinyl naphthalenes, divinyl benzene and the like onto a polymer or copolymer of conjugated diolefins such as polybutadiene or butadiene-styrene copolymers. The process is usually carried out in the presence of a peroxide catalyst, such as benzoyl peroxide, although the process can be carried out in the absence of a catalyst. Increased conversion of the reactive monomer can be secured if a catalyst is employed. Furthermore, the presence of the catalyst enables the reaction to be carried out at a lower temperature.

It has now been discovered that an improved graft polymer having a lower viscosity with higher monomer conversion can be obtained by grafting the monomer onto an oxidized liquid polymer or copolymer of a conjugated diolefin. If desired the grafting can be accomplished by carrying out the grafting operation during the oxidation of the liquid polymer.

The liquid polymers or copolymers of conjugated diolefins employed as the base for the grafting operation have molecular weights in the range of about 300 to about 5,000, and viscosities of about 0.2 to 2 strokes at 50% N.V.M. measured in Varsol. The polymer may be a homopolymer of a conjugated diolefin of 4 to 6 carbon atoms or a copolymer of such a diolefin and a vinyl aromatic hydrocarbon. Suitable diolefins include 1,3-butadiene, isoprene, piperylene, and 2,3-dimethyl-1,3-butadiene. Suitable vinyl aromatic hydrocarbons include styrene, methyl styrene, ethyl styrene and the like.

These liquid polymers can be prepared in bulk, suspension, emulsion or solution. A particularly suitable polymer is prepared by copolymerizing 100 to 50 parts of styrene with sodium as described in U.S. Patent No. 2,791,618 (1957) to J. E. Moise et al., but the practice of the invention is not limited to products prepared by this method.

The liquid polymers prepared as described above are oxidized by blowing with air or oxygen in the presence of an aromatic hydrocarbon solvent, particularly one having a kauri-butanol value of at least 40 as described in U.S. Patent No. 2,950,333 to D. F. Koenecke. Products having up to 20% oxygen content can be prepared in this manner.

In accordance with the invention the polymer oil is oxidized by air blowing in accordance with the disclosures of the Koenecke patent (supra) and the oxidized polymer then reacted with the monomer, e.g., styrene or vinyl toluene, etc., or the monomer can be added to the liquid base polymer and the air blowing conducted in the presence of the monomer.

Thus, the base polymer oil is oxidized by blowing with air or oxygen in the presence of an organic salt of cobalt, lead, iron, or manganese as catalyst at a temperature between 70 and 300° F. The polymer is preferably dissolved in an aromatic hydrocarbon solvent such as those boiling up to about 500° F., preferably between 200 and 400° F., e.g., benzene, toluene, hemimellitene, pseudocumene, mesitylene, propyl benzene, cymene, ethyl toluene, methyl ethyl benzene, xylenes, Solvesso 100 (a mixture of aromatic hydrocarbons boiling 300–350° F.), Solvesso 150 (a mixture of aromatic hydrocarbons boiling 335° to 410° F.) or mixtures thereof. Mixtures of these with aliphatic hydrocarbons, such as Varsol, which is a straight run mineral spirit boiling 285 to 400° F. and having an aromatic hydrocarbon content of 5 to 35 wt. percent are also suitable. The blowing is continued until the desired amount of oxygen has been added.

If the grafting operation is conducted simultaneously with the oxidation reaction, the reactive monomer, e.g., styrene, etc., is added to the base polymer in an amount between 5 and 40 wt. percent based on the polymer and the air blowing conducted as described above. If desired, the reactive monomer may be added continuously to the reactor instead of all at the beginning of the air blowing. If the grafting reaction is subsequent to the air blowing step, the oxidized polymer is mixed with 5 to 40% of the desired reactive monomer and the mixture heated to a temperature of 200–350° F. in the absence of added catalyst.

The resulting product whether prepared during or following the oxidation step has a lower viscosity for the same reactive monomer conversion level than similar graft polymers prepared from the non-oxidized polymer. For example, a graft polymer prepared from a non-oxidized polymer and having a solution viscosity of 2.5 stokes would contain not over about 53–54% of the available styrene while a graft polymer prepared from an oxidized polymer would contain over 61% of the available styrene at the same viscosity level. The amount of reactive monomer in the graft polymer will range from about 25 to 45 wt. percent and the viscosity of the graft polymer will range from 0.75 to 1.5 stokes at 45% N.V.M. in Varsol.

The following examples are given to illustrate the advantages of the invention but not to limit the same. All recipes and formulas are in parts by weight unless stated otherwise.

*Example 1*

A polybutadiene oil was prepared from the following charge:

| | Parts by weight |
|---|---|
| Butadiene | 100 |
| Varsol | 200 |
| Dioxane | 40 |
| Isopropanol | 0.2 |
| Sodium (10 to 50 micron dispersion) | 1.5 |

The polymerization of this charge was carried out at 50° C. in a five-stage commercial unit. The resulting product had a viscosity of .8–1.0 stokes at 50% N.V.M. in Varsol solution.

A portion of the polymer oil thus obtained was dissolved in toluene to make a 26% N.V.M. solution. It was then blown with air at about 280° F. for 150 minutes until the oxygen content reached 10.9%.

*Example 2*

The oxidized and unoxidized oils of Example 1 were mixed with solvent and styrene in accordance with the following recipe.

| Formulation | A | B |
| --- | --- | --- |
| Polybutadiene, parts/weight | 30 | |
| Oxidized polybutadiene, parts/weight | | 26 |
| Solvesso 100, parts/weight | 40 | |
| Toluene, parts/weight | | 51 |
| Styrene, parts/weight | 30 | 23 |

Each of these formulations were subjected to graft polymerization in accordance with the following table.

| Formulation | A | B |
| --- | --- | --- |
| Temperature, °F | 275 | 235 |
| Time, min | 180 | 75 |

The results obtained are shown in the following table:

| Formulation | A | B |
| --- | --- | --- |
| N.V.M., weight percent | 42.8 | 38.6 |
| Viscosity, stokes | 2.0 | 0.5 |
| Viscosity, stokes at 45% N.V.M | 3.5 | 0.75 |
| Percent styrene conversion | 43.2 | 42.8 |
| Weight percent oxygen | 0.0 | 8.2 |
| Weight percent polybutadiene in graft | 70.2 | 66.6 |
| Weight percent styrene in graft | 29.8 | 25.2 |

The above results show that the graft polymer prepared from the oxidized product has a markedly lower viscosity, 0.75 for the oxidized polymer as compared to 3.5 for the unoxidized polymer at the same concentration.

Furthermore, the reaction rate of the oxidized polymer with styrene is much faster as evidenced by the fact that the same conversion level (42–43 wt. percent) was reached at 40° F. lower temperature and in less than one-half the time.

*Example 3*

The unoxidized polybutadiene of Example 1 was oxidized in the presence of styrene monomer in accordance with the following recipe.

|  | Wt. Percent |
| --- | --- |
| Polybutadiene | 29 |
| Solvesso 100 | 42 |
| Styrene | 29 |
| Manganese naphthenate (6% soln.) | 0.4 |
| Oxygen rate, liters/hr. | 9.1 |
| Temperature, °F. | 175 |
| Time, min. | 180 |
| Oxygen absorption rate, liters/hr. | 5.43 |

The reaction proceeded smoothly with 61.2% styrene conversion. A graft polymer having the following characteristics was obtained:

| | |
| --- | --- |
| N.V.M., wt. percent | 49.1 |
| Viscosity, stokes | 2.4 |
| Viscosity at 45% N.V.M. | 1.1 |
| Wt. percent oxygen | 6.6 |
| Wt. percent styrene in graft | 35.5 |
| Wt. percent polybutadiene in graft | 58.0 |

When compared with the results of Run A in Example 2, these data show that performing the grafting operation during the oxidation step, under equivalent time and temperature conditions, results in a higher styrene conversion (61.2% compared with 43.2% in the thermal treatment of Run A) and in a lower viscosity (1.1 as compared with 3.5 of Run A).

*Example 4*

A series of experiments C, D, and E were carried out as described in Examples 2 and 3. Run A in Example 2 was also duplicated in the presence of .25 to .7 wt. percent of benzoyl peroxide as a catalyst during the grafting step. Data were obtained at various conditions of styrene conversion for each of the three systems. These data were plotted against product solution viscosity in stokes and the results shown in FIGURE 1.

These data show that grafting during oxidation (E) gives a lower viscosity product for a given styrene conversion than does either the thermal grafting operation of Run A of Example 2(C) or the same reaction carried out in the presence of a peroxide catalyst (D).

*Example 5*

The experiment of Example 3 was repeated except that the monomer added to the oxidation process was a mixture of 27 wt. percent of styrene and 2 wt. percent of divinyl benzene. The following conditions were employed.

| | |
| --- | --- |
| Oxygen rate, liters/hr. | 7.34 |
| Temperature, °F. | 260 |
| Time, min. | 180 |
| Oxygen absorption rate, l./hr. | 5.54 |

The process proceeded to a monomer conversion of 48.0%. A graft polymer having the following characteristics was obtained:

| | |
| --- | --- |
| N.V.M. wt. percent | 44.9 |
| Viscosity, stokes | 1.1 |
| Viscosity at 45% N.V.M. | 1.1 |
| Wt. percent oxygen | 7.3 |
| Wt. percent styrene in graft | 29.6 |
| Wt. percent polybutadiene in graft | 63.0 |

*Example 6*

The experiment of Example 3 was repeated in two different runs using cobalt naphthenate and cobalt decanoate, respectively, as the oxidation catalyst. The following recipes were used.

| Run | F | G |
| --- | --- | --- |
| Polybutadiene, weight percent | 30 | 30 |
| Solvesso 100, weight percent | 40 | 40 |
| Styrene, weight percent | 30 | 30 |
| Cobalt decanoate, ml. of 6% soln | 0.6 | |
| Cobalt naphthenate of 6% soln | | 0.4 |
| Oxygen rate, liters/hr | 8.28 | 7.6 |
| Temperature, °F | 265 | 275 |
| Time, min | 150 | 165 |
| Oxygen absorption rate, l./hr | 5.5 | 5.45 |
| Styrene conversion, weight percent | 76.7 | 83.0 |

Graft polymers having the following characteristics were obtained.

| | | |
| --- | --- | --- |
| N.V.M., weight percent | 53.9 | 53.6 |
| Viscosity at 45% N.V.M., stokes | 1.2 | 1.0 |
| Weight percent oxygen | 5.3 | 6.2 |
| Weight percent styrene in graft | 41.1 | 38.1 |
| Weight percent polybutadiene in graft | 53.6 | 55.7 |

The above data show that organic cobalt compounds as oxidation catalyst results in higher styrene conversion levels under equivalent conditions while obtaining a low viscosity product.

*Example 7*

The following graft polymers were prepared:
(H) The copolymer of 80% butadiene-1,3 and 20% styrene prepared in the same manner as the polybutadiene of Example 1, and oxidized in the presence of styrene as described in Example 3.

(I) The above copolymer, oxidized as in Example 1 to 10% oxygen and grafted with styrene as in Example 2.

(J) The polybutadiene of Example 1, oxidized in the presence of styrene as in Example 3.

Films were laid down from the above graft polymers and cured for 45 minutes at 320° F.

Films were also prepared from the following polymers known in the art:

(K) A resinifiable mix was prepared with 350 grams of polybutadiene and 500 grams of toluene. This mix was heated to 114° C., and within the course of 13 minutes a solution of 150 grams of vinyl toluene, 10 grams of divinyl benzene (50 to 60%), and 2.5 grams of benzoyl peroxide were incorporated therein. The reaction temperature was increased to 118.5° C. and was maintained at this level for 95 minutes to prepare a graft polymer.

(L) A graft polymer of polybutadiene and vinyl toluene prepared by mixing 85 parts of polybutadiene with 15 parts of vinyl toluene and 0.04 part of dicumyl peroxide and heating the mixture at 300° F. for 35 minutes.

(M) A graft polymer prepared from polybutadiene grafted with styrene and divinyl benzene.

(N) Polymer (M) subsequently blown with air.

Each of the polymers K, L, M, and N were cured for thirty minutes at 300° F. and at 350° F.

The following table sets forth the film properties of each of the polymers and shows that the polymers of this invention, i.e., polymers H, I, and J (duplicate runs of which are set forth) are superior to those of the graft polymer of polybutadiene and vinyl toluene.

a reactive monomer selected from the group consisting of styrene, vinyl toluene, vinyl naphthalene, divinyl benzene and mixtures thereof and blowing said mixture in a hydrocarbon solvent with a gas chosen from the group consisting of air and oxygen at a temperature between 70 and 300° F. in the presence of an organic salt of cobalt, lead, iron or manganese as catalyst until at least a small amount of oxygen has been incorporated into the polymer.

2. Process according to claim 1 in which the reactive monomer is added to the liquid polymer continuously during the blowing operation.

3. A method for preparing a graft copolymer which comprises mixing a liquid copolymer of a conjugated diolefin of 4 to 6 carbon atoms and a vinyl aromatic hydrocarbon with 5 to 40 wt. percent of a reactive monomer selected from the group consisting of styrene, vinyl toluene, vinyl naphthalene, divinyl benzene and mixtures thereof and blowing said mixture in a hydrocarbon solvent with a gas chosen from the group consisting of air and oxygen at a temperature between 70 and 300° F.

FILM PROPERTIES OF OXIDATION GRAFT POLYMERS

| Polymer Description | Cure Conditions | | | | | | | | |
|---|---|---|---|---|---|---|---|---|---|
| | 30' at 350° F. | | | 45' at 320° F. | | | 30' at 300° F. | | |
| | Thick. (Mils) | Hardness (Pencil), H | Rev. Imp. | Thick. (Mils) | Hardness (Pencil), H | Rev. Imp. | Thick. (Mils) | Hardness (Pencil), H | Rev. Imp. |
| Polymer K | 1.2 | 2 | <5 | | | | 1.25 | 3 | |
| Polymer L | 1.0 | 2 | <5 | | | | | | |
| Polymer M | 1.0 | 4 | <5 | | | | | | |
| Polymer N | 1.1 | 5 | <5 | | | | 1.2 | 3 | |
| Polymer H | | | | 1.1 | 4 | <5 | | | |
| Do | | | | 1.1 | 4 | <5 | | | |
| Polymer I | | | | .9 | 5 | <5 | | | |
| Do | | | | .8 | 6 | <5 | | | |
| Polymer J | | | | 1.0 | 3 | <5 | | | |
| Do | | | | 1.3 | 4 | <5 | | | |

Film properties are at least equivalent to those of Polymer N (oxidized). They are superior to those of Polymers K and L (unoxidized).

As many possible embodiments can be made of this invention without departing from the scope thereof, it is to be understood that all matter herein set forth is to be interpreted as illustrative and not as unduly limiting the invention.

The nature and objects of the present invention having been thus fully set forth and specific examples of the same given, what is claimed as new and useful and desired to be secured by Letters Patent is:

1. A method for preparing a graft copolymer which comprises mixing a liquid polymer of a conjugated diolefin of 4 to 6 carbon atoms with 5 to 40 wt. percent of in the presence of an organic salt of cobalt, lead, iron or manganese as catalyst until at least a small amount of oxygen has been incorporated into the polymer.

References Cited by the Examiner

UNITED STATES PATENTS 3,086,942   4/1963   Panzer et al. _____ 204—154
3,099,293   7/1963   Lakritz et al. _____ 260—880

MURRAY TILLMAN, *Primary Examiner.*

G. F. LESMES, *Assistant Examiner.*